March 10, 1942.  J. BIJUR  2,276,146
LUBRICATION
Filed Oct. 22, 1935
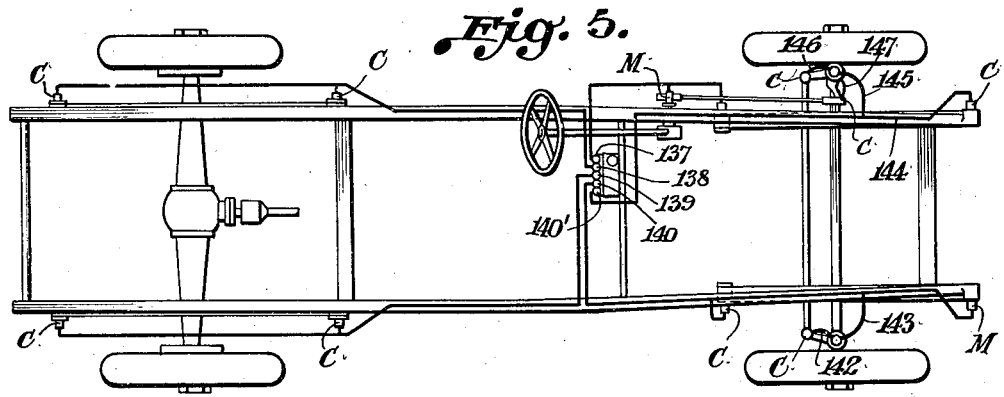
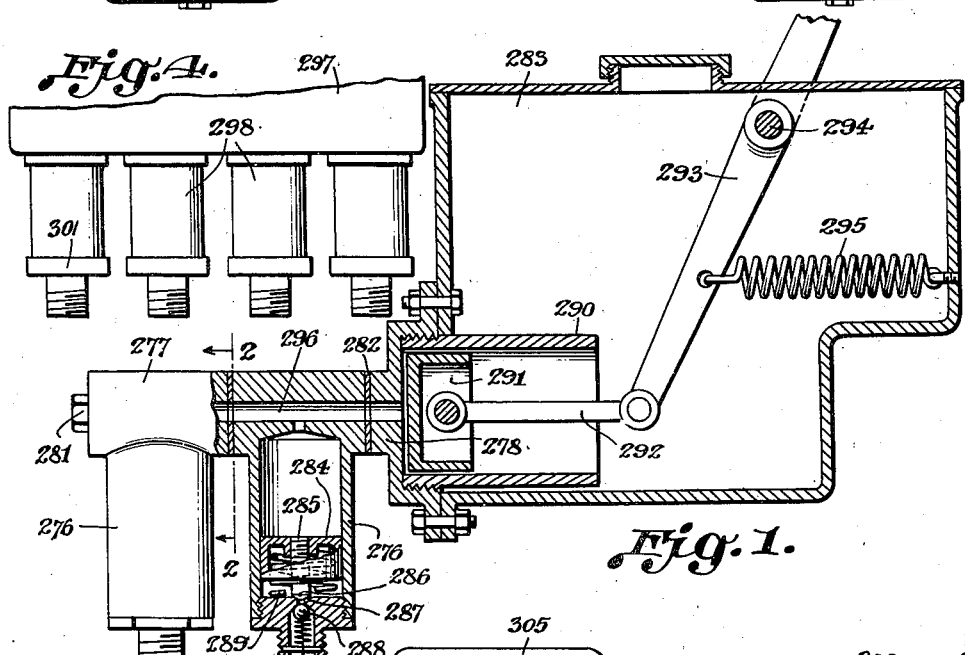
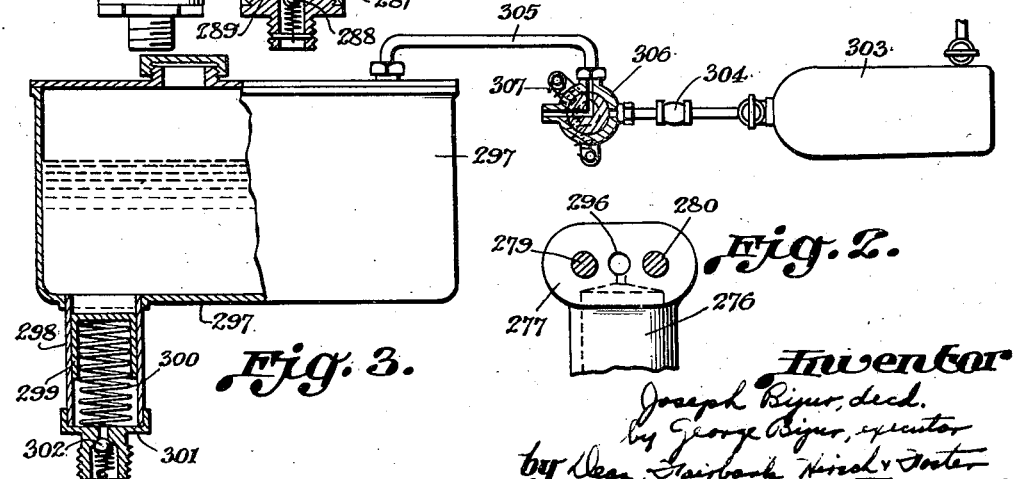

Patented Mar. 10, 1942

2,276,146

UNITED STATES PATENT OFFICE 2,276,146

LUBRICATION

Joseph Bijur, deceased, late of New York, N. Y., by George Bijur, executor, New York, N. Y., assignor to Auto Research Corporation, a corporation of Delaware Application October 22, 1935, Serial No. 46,080½

1 Claim. (Cl. 184—7)

The present invention relates to remote control lubrication and is concerned primarily with systems and installations, and the constituent elements thereof, for lubricating one or more bearings on a machine or group of machines, from a readily accessible point or points of control.

The invention has its preferred application to the lubrication of all or most of the bearings on the chassis of a vehicle, such as an automobile or motor truck although it may be applied to the apportioning of other liquids than lubricants to a plurality of devices on the same or different machines, other than an automobile.

An object is to provide a reliable lubricating installation, more particularly for motor vehicles, the use of which shall not require the exercise of any selective discretion, but in which following the simplest of manipulations, predetermined charges of lubricant may be distributed at a plurality of bearings, whether tight or loose, without excessive overflow.

Another object is to provide apparatus of the above type, the constituent parts of which shall be simple and durable in construction, easy to install, and unlikely to become out of order even after prolonged use.

The invention is primarily concerned with pressure lubricating systems, that is, with systems in which desired charges of oil are forced under pressure into the bearings.

It may be noted that where in a system of this type, oil is forced from a pump past a plurality of relief valves in parallel to corresponding bearings, unless the resistance to pressure of each line from the pump to a bearing, including the resistances of said bearing and of the relief valve in the line, is substantially uniform, lubricant is likely to be forced, first through the line of least resistance, so that pressure is relieved therethrough, and disproportionate charges of oil from the pump cylinder may be supplied to different bearings, some overflowing and others receiving too little oil.

By this invention, there is provided an arrangement for overcoming this objection. In one embodiment of the invention a lubricant measuring device is provided preferably one for each bearing or group of bearings to assure a supply thereto, upon operation of the predetermined measured quantity of lubricant.

In the accompanying drawing in which are shown some of various possible embodiments of the several features of the invention:

Fig. 1 is a sectional view of one form of pump.

Fig. 2 is a detail transverse sectional view taken along the line 2—2 of Fig. 1.

Fig. 3 is a diagrammatic view partly in longitudinal cross-section of a further embodiment of pump and control means therefor.

Fig. 4 is a fragmentary front elevation of the embodiment of Fig. 3.

Fig. 5 is a diagrammatic layout of a chassis lubricating installation utilizing the pressures and proportioning arrangement of Figs. 1 to 4.

In Figs. 1 and 2 is shown one embodiment of a multi-sectional pump according to the present invention.

Each of a plurality of identical sections comprises a cylinder 276 having at its upper end on either side a machined face or a lug 277 adapted to contact with a corresponding lug 278 on the tank or on a contiguous pump section. Through the upper portion of each pump unit are threaded rods 279 and 280 (Fig. 2) so that by nuts 281 tightened thereon, the sections with interposed packing 282 are clamped together and to the reservoir 283.

The cylindrical bore of each section has a loosely fitting piston 284 therein. The piston head is provided with a valve stem 285 having a conical end 286 to seat in a valve seat 287 below which is the usual ball relief valve 288. Normally, a coil spring 289 within piston head 284 and about stem 285 pushes the piston to the top of its stroke and oil leaks by the piston to fill the cavity therebelow.

In the main oil reservoir 283, the major portion of which is at a level higher than the small cylinders 276, a submerged cylinder 290 is fitted horizontally and a loosely fit control piston 291 is slidable therein and operated by the connecting rod 292 pinned to the handle 293 mounted on the cross shaft 294 in the tank wall.

The cross shaft is above the highest level to which the tank is filled, so that no leakage can occur though packing is omitted.

A helical spring 295 pulls lever 293 in a direction to charge the submerged cylinder 290 with oil which flows past the piston 291 by reason of the loose fit thereof.

In operation of this device, the tank being filled with oil and piston 291 at the right end of its travel, the handle 293 is pulled to bring the piston into the position shown on the drawing at the end of its stroke.

Thus, oil to the left of the piston is forced into the separate cylinders 276 through communicating passages 296 and said oil forces the small pistons 284 down, opens relief valves 288 and expels the charge of oil below them into the various individual pipe lines, until at the ends of the pump stroke, the conical ends 286 of the piston stems seal the outlets, as do also the skirts of the pistons in Fig. 3 by contact with the bottom walls of the cylinders.

A definite measured quantity only is, therefore, supplied by each piston to the bearing or bearings to be supplied therefrom.

In Figs. 3 and 4 is shown another embodiment of multi-section pump, that is, a pump in which measured quantities of oil are supplied to each of a plurality of conduits.

In this embodiment, an oil tank 297 has threaded into the bottom thereof, a plurality of cylinders 298 each containing a piston 299 loosely fitting therein and urged upward to charged position by a spring 300 reacting against the outlet cap 301 which latter carries the usual relief valve 302. By leakage past the pistons the space below is normally filled with oil.

In the present embodiment, the cylinders are discharged by compressed air delivered from a tank 303 through a reducing valve 304 connected by conduit 305 to the top of the tank 297 which is closed substantially air-tight.

A two-way valve 306 manually operated connects the top of the tank 297 alternatively either to the pressure tank 303 or to atmosphere, spring 307 normally maintaining the valve in the latter position. Pressure cylinder 303 is charged occasionally at a garage from the same supply used for filling the tires, or a previously charged tank of air, acetylene or other gas may be used.

When the two-way valve 306 is turned, air flows into the oil tank past the reducing valve 304, under a safe pressure and thus puts the oil therein under pressure which causes the pistons 299 to slide downward, expelling the oil below them into the separate lines. The skirts of the pistons seat on the ends of the cylinder, thus preventing oil from flowing by them in substantial amounts, after they have reached the ends of their strokes.

It is to be understood that the individual cylinders or piston devices 276—284 of Fig. 1 and 298 to 299 of Fig. 3 might be connected individually to a bearing or to a group of bearings having gravity distributing systems, as for example, disclosed in Patents Nos. 1,779,205, 1,939,653, 1,974,415, 1,991,370, and 2,009,429, and/or to one or more measuring valves, such as is disclosed in Patent No. 2,003,281, or in the parent application Serial No. 596,856, filed October 25, 1922, now Patent No. 2,017,848, and/or to a group of flow restriction fittings, such as are disclosed in Patents Nos. 1,632,771 or 1,975,920.

In Figs. 1 and 2 a liquid pressure device is shown as actuating the assembled piston-cylinder combinations, while in Figs. 3 and 4 a source of pneumatic pressure is shown effecting the same result, but it is to be understood that various other fluid pressure devices may be employed to actuate the pistons in the respective cylinders to cause a feeding of lubricant in measured quantities to the respective bearings. It is to be understood that the cylinder-piston combinations of Figs. 1 and 2 and Figs. 3 and 4 may be interchanged and that the lever 293 of Figs. 1 and 2 and the valve 306 of Figs. 3 and 4 may be automatically actuated.

Fig. 5 shows the application of the pump units of Figs. 1 and 2 or Figs. 3 and 4 to an automobile chassis but it is to be understood that any other suitable mechanism may be fed the predetermined quantities of lubricant in the same fashion.

In Fig. 5 the various cylinders 137, 138, 139, 140 and 140' are shown as supplying various conduits 142, 143, 144, 145, 146 and 147 leading to bearings in and about the automobile chassis, which bearings may be provided with control devices designated C and M, for example of the type shown in Figs. 3, 6 and 7 of the parent application, Serial No. 596,856, filed October 25, 1922, or flow metering devices of the type shown in Patent No. 1,632,771.

The present application is a continuation in part of application, Serial No. 596,856, filed October 25, 1922, now Patent No. 2,017,848, and Figs. 1 to 5 of the present application respectively correspond to Figs. 21, 22, 23, 24 and 8 of said application.

As many changes could be made in the above construction, and many apparently widely different embodiments of this invention could be devised without departing from the scope thereof, it is intended that all matter contained in the above description or shown in the accompanying drawing, shall be interpreted as illustrative and not in a limiting sense.

What is claimed is:

A centralized lubricating installation for a mechanism having a plurality of spaced and distributed bearings, said installation comprising a central reservoir and distributing station and a plurality of independent conduits leading from said station to the bearings to be lubricated, each receiving a measured charge of lubricant from said station, said station comprising a main chamber and a plurality of auxiliary chambers, one for each conduit, directly attached to and opening into the bottom of said main chamber, pressure means to force lubricant from said main chamber into said auxiliary chambers, said means simultaneously causing said auxiliary chambers to discharge into said conduits, each auxiliary chamber discharging a measured charge into its respective conduit, said auxiliary chambers being at all times substantially completely filled with lubricant, each said auxiliary chamber having a threaded cap closing the outlet end thereof having a central bore and a threaded outlet nipple communicating with said bore, said nipple receiving a spring seated ball check, including a cup shaped piston member, the cup of which opens downwardly, a coil spring received in the cup of said piston pressing it toward the opening into the bottom of the main chamber, said spring reacting against said cap and the outer edge of said cup contacting said threaded cap when in lowermost position and sealing the outlet through said cap when lubricant is forced from said main chamber into said auxiliary chambers, said pistons returning toward the bottom of the main chamber under the force of said coil spring by reason of by-passage of lubricant when the pressure forcing the lubricant from said main chamber into said auxiliary chambers is released.

GEORGE BIJUR,
Executor of the Estate of Joseph Bijur, deceased.